US006847513B2

(12) United States Patent
Clapp, III et al.

(10) Patent No.: US 6,847,513 B2
(45) Date of Patent: Jan. 25, 2005

(54) CURRENT LIMITER FOR MAGNETO-RESISTIVE CIRCUIT ELEMENT

(75) Inventors: John S. Clapp, III, Wyomissing Berks, PA (US); Thanh Van Nguyen, Berks, PA (US)

(73) Assignee: Agere Systems Inc., Allentown, PA (US)

( * ) Notice: Subject to any disclaimer, the term of this patent is extended or adjusted under 35 U.S.C. 154(b) by 98 days.

(21) Appl. No.: 09/747,924

(22) Filed: Dec. 27, 2000

(65) Prior Publication Data

US 2002/0080538 A1 Jun. 27, 2002

(51) Int. Cl.$^7$ ................................................ H02H 9/00
(52) U.S. Cl. ...................................... 361/58; 361/93.9
(58) Field of Search .............................. 361/54, 57, 56, 361/93.1, 91.1, 93.9, 58, 91.2, 93.7, 93.8

(56) References Cited

U.S. PATENT DOCUMENTS

| | | | |
|---|---|---|---|
| 5,291,347 A | | 3/1994 | Ngo et al. |
| 5,446,367 A | * | 8/1995 | Pinney ........................ 323/266 |
| 5,869,988 A | | 2/1999 | Jusuf et al. |
| 6,108,183 A | * | 8/2000 | Beene ......................... 361/103 |
| 6,121,800 A | | 9/2000 | Leighton et al. |
| 6,236,247 B1 | | 5/2001 | Ngo |
| 6,285,221 B1 | | 9/2001 | Leighton et al. |
| 6,297,921 B1 | | 10/2001 | Price, Jr. et al. |
| 6,331,921 B1 | * | 12/2001 | Davis et al. ................... 360/46 |
| 6,362,943 B1 | * | 3/2002 | Galecki et al. ............. 361/93.9 |
| 6,429,987 B1 | | 8/2002 | Cheng |
| 6,452,766 B1 | * | 9/2002 | Carper ......................... 361/18 |

* cited by examiner

Primary Examiner—Ronald Leja
Assistant Examiner—Danny Nguyen

(57) ABSTRACT

A current limiter circuit for limiting current in an electrical circuit element such as the magneto-resistive portion of a read head forming a portion of a hard disk drive and including: a first circuit connected to one end of the circuit element for applying a bias current of a desired value to the circuit element in response to the value to an input signal; a second circuit connected to the other end of the circuit element for setting the amplitude of the voltage signal generated across the circuit element in response to the bias current; and a third electrical circuit connected to both the first and second circuits for limiting the value of bias current to a predetermined level for an abnormal event such as a current surge, a short circuit, or any other type of undesired current operating condition.

20 Claims, 3 Drawing Sheets

CURRENT LIMITER FOR MAGNETO-RESISTIVE CIRCUIT ELEMENT

BACKGROUND OF THE INVENTION

1. Field of the Invention

Figure 1:
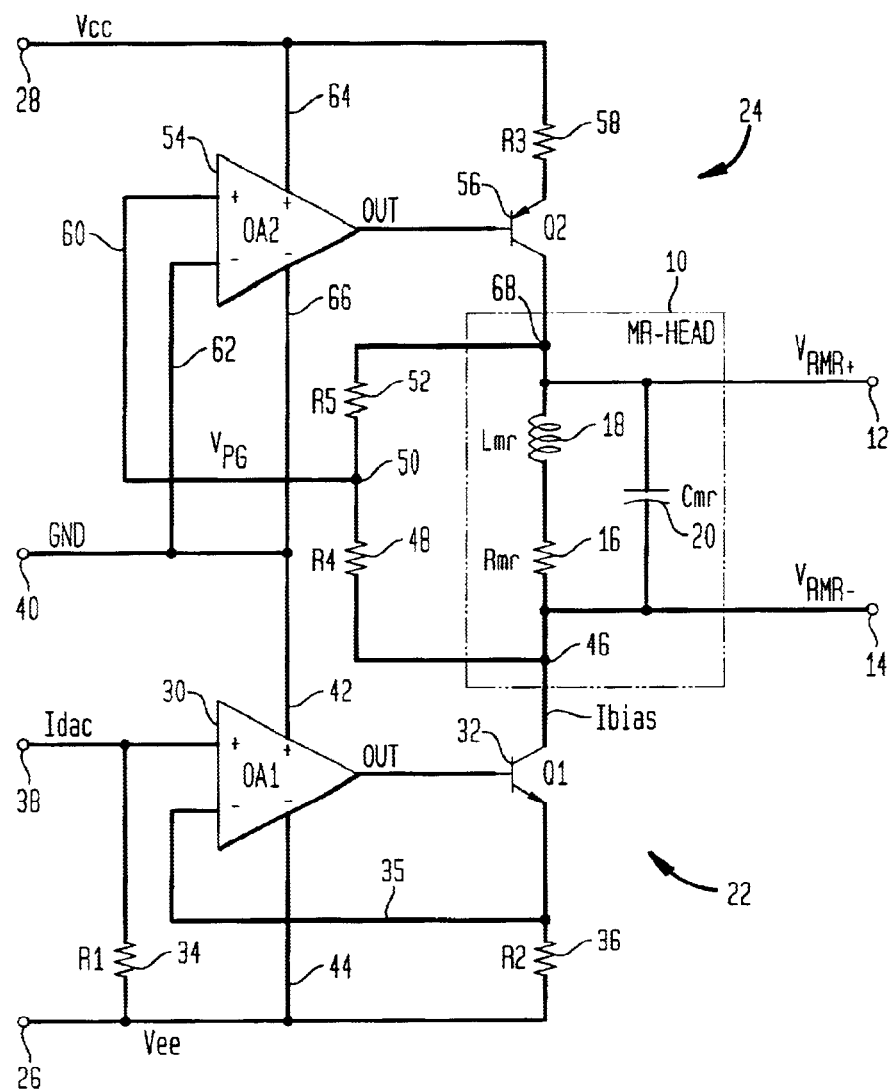

This invention relates generally to circuitry for protecting an electrical circuit element from possible catastrophic damage during operation and more particularly to limiting circuitry for current in the magneto-resistive element of a magnetic read head in response to an abnormal operating condition such as a short circuit occurring in the element.

2. Description of Related Art

Apparatus for controlling the bias current in a magneto-resistive element utilized in a read head of a high performance hard disk drive differential preamplifier is generally known. Conventional approaches sometimes resort to fixed level limiting which wastes power consumption particularly when the bias current must be programmable over a wide range. However, such apparatus is not known to include means for limiting the current to a level which can prevent catastrophic damage when the element is shorted. Furthermore, limiting by means of shunting the excess current away requires large output devices and wastes unnecessary power.

SUMMARY

Accordingly, it is an object of the present invention to provide apparatus for limiting the current flow therein to a desired level.

It is another object of the invention to provide apparatus for limiting the current flow in a circuit element to a desired level for damage prevention purposes.

And it is yet another object of the present invention to limit the current in a magneto-resistive element to a desired level so as to prevent catastrophic damage.

It is still a further object of the invention to provide apparatus for controlling the bias current of a magneto-resistive element used in a magnetic read head in a high performance hard disk drive differential preamplifier in the event of an abnormal condition such as a short circuit.

These and other objectives are achieved by apparatus for limiting current in an electrical circuit element, comprising: a circuit element operating in response to a bias current fed thereto for generating a voltage signal across the circuit element; a first circuit connected to one end of the circuit element for applying a bias current of a desired value to the circuit element in response to the value to an input signal; a second circuit connected to the other end of the circuit element for setting the amplitude of the voltage signal generated across the circuit element in response to the bias current; and, a third electrical circuit connected to both the first and second circuits for limiting the value of bias current to a predetermined level for an abnormal event such as a current surge, short circuit, or any other type of undesired current condition in a circuit element such as the magneto-resistive portion of a read head forming a portion of a hard disk drive.

Further scope of applicability of the present invention will become apparent from the detailed description provided hereinafter. It should be understood, however, that the detailed description and specific embodiment of the invention, while indicating the preferred embodiment thereof, is provided by way of illustration only, since various changes, modifications, and alterations coming within the spirit and scope of the invention will become apparent to those skilled in the art.

DETAILED DESCRIPTION OF THE DRAWINGS

Figure 2:
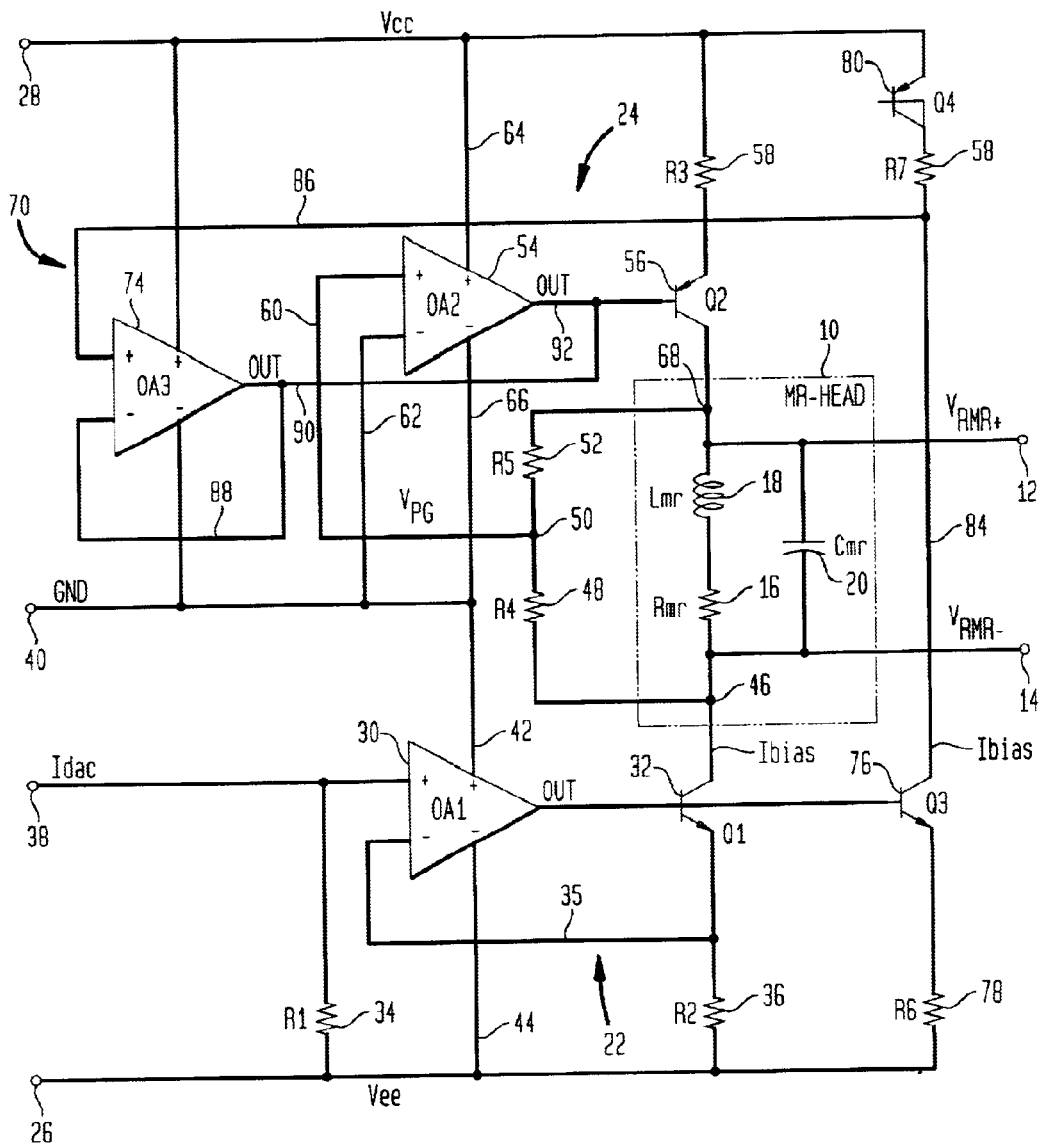
Figure 3:
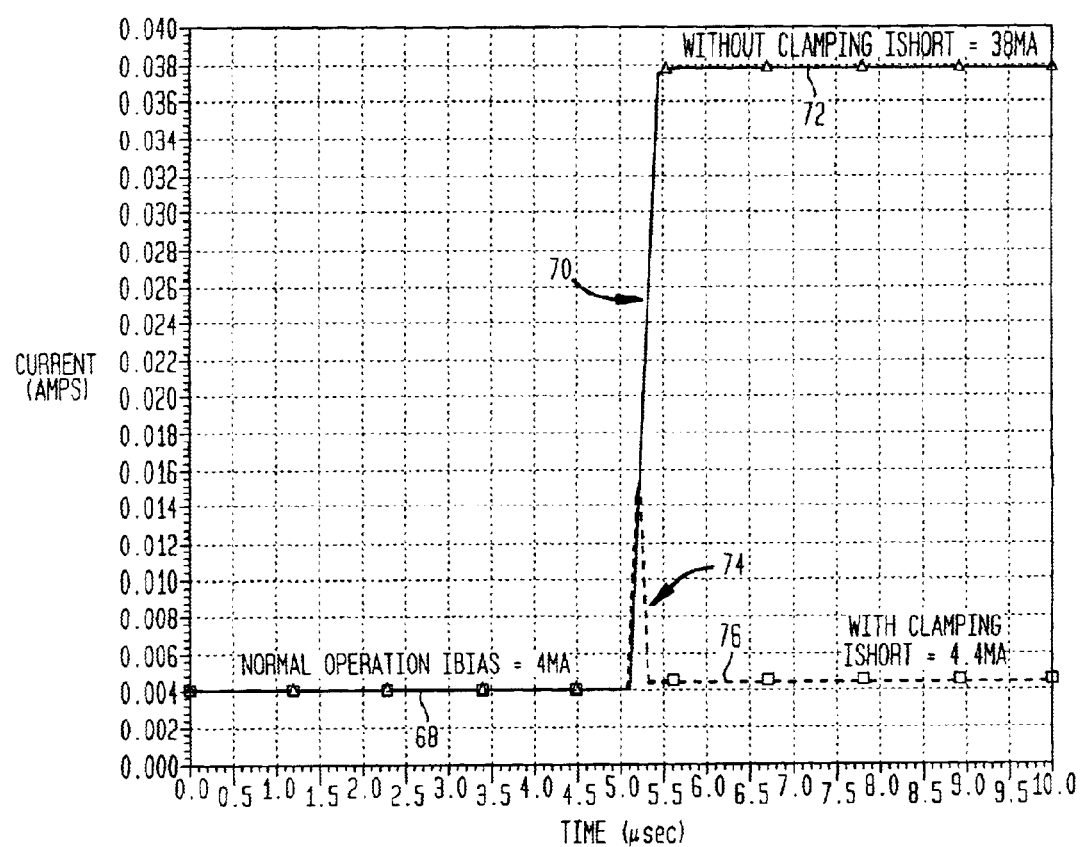

The present invention will become more fully understood when the detailed description provided hereinafter is considered in connection with the accompanying drawings which are provided by way of illustration only, and thus are not meant to be considered in a limiting sense, and, wherein:

FIG. 1 is a schematic electrical diagram of conventional apparatus for supplying DC bias current in a magneto-resistive head of a hard disk drive;

FIG. 2 is an electrical schematic diagram in accordance with the subject invention illustrative of an apparatus for providing a DC bias current as shown in FIG. 1, but now including current limiting so as to provide protection for a shorted head of a magneto-resistive read head; and, FIG. 3 is a graphical illustration of the operation of the circuitry shown in FIGS. 1 and 2 upon the occurrence of a short circuit event.

DETAILED DESCRIPTION OF THE INVENTION

Referring now to the drawings wherein like reference numerals refer to like components throughout, attention is directed first to FIG. 1 wherein there is shown a schematic diagram of a conventional circuit for supplying and controlling bias current to a magneto-resistive read head (MR-HEAD) 10 which is connected to a high performance hard disk drive differential preamplifier, not shown, via differential voltage Vrmr+ and Vrmr− output terminals 12 and 14. The MR-HEAD 10 is comprised of resistive Rmr element 16, a series inductive Lmr element 18 and a parallel capacitive Cmr element 20. The lower and upper ends of the read head 10 are connected to servo loops 22 and 24 which have a Vee (−5 Vdc) supply voltage and Vcc (+5 Vdc) supply voltage coupled thereto via terminals 26 and 28.

The lower servo loop 22 includes an OA1 operational amplifier 30, an n-p-n bipolar transistor 32, an R1 resistor 34 and an R2 resistor 36. The (+) input terminal of OA1 30 is connected to an input terminal 38 which receives a current Idac which is the output of a programmable digital-to-analog converter (DAC), not shown. The R1 resistor 34 is connected between the (+) input terminal of OA1 30 and the Vee supply terminal 26. The output terminal (OUT) of OA 30 is connected to the base of Q1 transistor 32. The emitter of Q1 transistor 32 is connected back to the (−) input terminal of OA1 30, via circuit lead 35, forming a unity gain amplifier thereby, and to an R2 resistor 36 which is also connected to the Vee supply terminal 26. OA1 30 also includes a (+) bias terminal connected to ground terminal 40 by means of circuit lead 42. The OA1 30 also includes a (−) bias terminal connected to the Vee supply terminal 28 via circuit lead 44. The collector of Q1 transistor 32 is connected to one side of the MR HEAD 10 which is common to the Vrmr− voltage output terminal 14 and to a R4 resistor 48 which connects to a circuit node 50, which also includes a connection to the upper servo loop 24 via R5 resistor 52.

The upper servo loop 24 as shown in FIG. 1, in addition to R5 transistor 52, includes OA2 54, p-n-p bipolar transistor 56, and R3 resistor 58. Further as shown, the (+) input terminal of OA2 54 is connected to the circuit node 50 via circuit lead 60 while the (−) input terminal is returned to ground potential via circuit lead 62. Vcc supply potential is also connected to the (+) bias terminal of OA2 by means of circuit lead 64, while the (−) bias terminal thereof is also connected to ground via circuit lead 66. The output terminal (Out) of OA2 54 is connected to the base of Q2 transistor 56 whose collector is commonly connected to the opposite end of the MR HEAD 10 at circuit node 68 and which is common to the Vrmr+ voltage output terminal 12 and R5 resistor 52. The emitter of Q2 transistor 56 is connected to Vcc supply potential via R3 resistor 58.

Considering now the operation of the circuit shown in FIG. 1, in the quiescent or idle state where Idac at terminal 38 is zero, for example, 0 mA, both inputs (+) and (−) of OA1 30 are at a potential of Vee(−5 Vdc) by virtue of R1 and R2 transistors 36 and 38. The Q1 transistor 32 is non-conducting and therefore in an OFF state. This results in a zero bias current (Ibias=0) at the collector of Q1 transistor 32 and the voltage Vpg being greater than ground potential. Since the (+) input terminal of OA2 is tied to Vpg, the output of OA2 54 is at Vcc(+5 Vdc) and since the OUT terminal of OA2 is connected to the base of Q2 transistor 56, it also is in a non-conductive or OFF state.

During normal operation, when the input current Idac>0, the voltage at the base of Q1 transistor 32 causes it to become conductive. A current of Ibias results having a value of Idac times the value of the ratio of R1 resistor 36 and R2 resistor 38, i.e., Ibias=Idac R1/R2. This pulls the Vpg voltage at node 50 below ground potential. This causes the output of the OA2 54 applied to base Q2 transistor 56 to turn Q2 transistor 56 ON regulating the voltage at the base of Q2 to a value of Vcc−(Ibias×R3)−VbeQ2, where VbeQ2 is the base to emitter voltage of Q2. This sets the differential voltage bias Vrmr+ and Vrmr− across the MR HEAD 10 and 14 to be equal to Ibias×(Rmr/2). In a typical application, the value of Ibias in such a circuit configuration would be 4 mA.

In the event that the MR HEAD 10 becomes shorted to ground while a Idac is present at terminal 38, a bias current Ibias=(Idac R1)/R2 will still be present at circuit node 46 and the voltage Vpg at circuit node 50 is still below ground potential. This causes the voltage at the base of Q2 transistor 56 to saturate to a value of VsatOA2=Vcc−(Ishort×R3) VbeQ2, where Ishort=(Vcc−VbeQ2−VsatOA2)/R3. and where VsatOA2 is the saturated output voltage of OA2 54.

In normal operation, there is a balanced Ibias current in the lower and upper servo loops 22 and 24 such that the current through Q1 transistor 32, is equal to the current through Q2 transistor 56. This is depicted as the horizontal 4 mA current portion 68 of the current vs. time characteristic curve 70 shown in FIG. 3. However, a shorted condition in the circuit shown in FIG. 1 results in the current typically rising to a Ishort value of 38 mA as shown by the horizontal portion 72 of the curve 70.

Considering now the subject invention and its preferred embodiment, FIG. 2 is illustrative of an arrangement which will limit the current through a magneto-resistance circuit element such as the MR HEAD 10 in the event that an abnormal current condition such as when a short occurs and until the shorted condition is removed, thereby enabling automatic recovery against any temporary shorted condition or after a head replacement because of a permanent shorted condition. The present invention is not meant to be limited to these types of events, since it could also be used for protection against undesired current surges or the like or any other type of potentially harmful current condition.

The circuit configuration of FIG. 2 involves the addition of a current limiter in the form of a third servo loop 72 including not only existing Q2 transistor 56 and R3 resistor, but also now OA3 74, Q3 transistor 76, R6 resistor 78, Q4 transistor 80, and R7 resistor 82. The 78 connects the emitter of Q3 transistor 76 to the Vcc supply potential applied to terminal 28. The OUT terminal of QA1 is now connected to both the base of Q1 transistor 32 and the base of Q3 transistor 76. The base and collector of Q4 transistor 80 are connected to the collector of Q3 transistor 76 via circuit lead 84 and to the (+) input of OA3 74 via circuit lead 86. The output terminal Out of OA3 74 is connected not only back to the (−) input thereof via circuit lead 88, but, more importantly, to the base of Q2 transistor 56 via circuit lead 90. The output of OA2 54 is also connected to the base of Q2 transistor 56 via circuit lead 92 as in the circuit FIG. 1. Thus, the outputs of OA2 54 and OA3 74 are connected in parallel to the base of Q2 transistor 56. The latter comprises an important circuit element as will now become evident. It should be noted that in the preferred embodiment of the invention as shown in FIG. 2, OA2 and OA3 are operational transconductance amplifiers.

At rest or in an idle state where Idac is 0, both Q1 transistor 32 and Q3 transistor 76 are in a non-conductive state. This results in zero (Ibias=0) collector currents of Q1 and Q3 transistors 32 and 76. The OUT output terminal of OA2 connected to the base of Q2 transistor 56 is at Vcc, but the base of Q2 is also connected in parallel to the output of OA3 74 whose output is equal to Vcc−Vbe of Q4 transistor 80. This is less than the output of OA2 54. Therefore, the voltage at base of Q2 transistor 56 is at a voltage Vcc, causing it to be non-conducting.

In normal operation, when Idac>0, a voltage is generated across R1 resistor 34 which is applied to the (+) input of OA1 30, Q1 transistor 32 now becomes conductive, causing an Ibias collector current of (Idac×R1)/2 to flow, which pulls the voltage Vpg at circuit node 50 below ground as in FIG. 1. This also causes the voltage at the OUT terminal of OA2 54 to become equal to Vcc−Vbe Q2−(Ibias×R3). Again, noting that the output of terminal OUT of OA3 74 is in parallel with the OUT terminal of OA2 and is equal to Vcc−Vbe Q4−(Ibias×R7). By setting a value of R7 transistor 82 equal to mR3, where m>1, the output voltage of OA2 54 is greater than the output voltage of the OA3 74. Therefore, the voltage at the base of Q2 transistor 56 sees the output of OA2 54 and thus a normal operation as in FIG. 1 is obtained.

However, when the MR HEAD 10 becomes shorted to ground, even though the Vpg voltage at circuit node 50 is still below ground, the voltage at the base of Q2 transistor 56 will become clamped to the output voltage of the OA3 74, which is greater than VsatOA2. Accordingly, the voltage at the base of Q2 transistor 56 is regulated to a value of Vcc−Ishort×R3−VbeQ2, where I short=m×Ibias where m is equal to R7/R3. The value of R7 resistor 82 is selected to be greater than that of R3 resistor 58 so that m>1. Such an operation is shown by the waveform 74 in FIG. 3 where a shorted condition occurs at 5 μs and the Ishort portion 76 is clamped to 4.4 mA where, for example, the values of R7=110 ohms and the value of R3=100 ohms, then m=110/100=1.1 and an Ishort of 4.4 mA results for an Ibias of 4.0 mA.

The embodiment of the subject invention as shown in FIG. 2 is adaptive in that Ishort will be limited to m×Ibias for the entire range of Ibias. Also, in this embodiment power is not wasted by shunting the excess current to ground.

While the subject invention was developed specifically for controlling the bias current of a magneto-resistive read head which is used in a hard disk drive, the basic principle can be applied to any application requiring a limiting of DC current to a desired level. Also, while bipolar transistors are shown in the disclosed embodiment of the invention, other types of semiconductor devices could be employed such as field effect transistors, for example. Furthermore, the subject invention can be implemented in the structure of an integrated circuit.

The foregoing detailed description merely illustrates the principles of the invention. It will thus be appreciated that those skilled in the art will be able to devise various arrangements which, although not explicitly described or shown herein, embody the principles of the invention and thus are within its spirit and scope.

What is claimed is:

1. Apparatus for limiting current in an electrical circuit element, comprising:
   a circuit element operating in response to a bias current fed thereto for generating an output voltage signal across the circuit element;
   a first circuit connected to one end of the circuit element for applying a bias current of a desired value to the circuit element in response to the value to an input signal;
   a second circuit connected to the other end of the circuit element for setting the amplitude of the output voltage signal generated across the circuit element in response to the bias current; and,
   a third electrical circuit connected to both the first and second circuits for limiting the value of the bias current to a predetermined level in response to an abnormal current condition of the circuit element; and wherein
   the first, second and third electrical circuits are implemented in an integrated circuit.

2. The apparatus according to claim 1 wherein the circuit element comprises a magneto-resistive circuit element.

3. The apparatus according to claim 2 wherein the abnormal current condition comprises a short circuit condition of the magneto-resistive circuit element.

4. The apparatus according to claim 3 wherein the magneto-resistive element forms part of a read head for a hard disk drive and wherein the output voltage generated across the circuit element comprises a differential voltage.

5. Apparatus for limiting current in a magneto-resistive circuit element, comprising:
   a magneto resistive circuit element operating in response to a bias current fed thereto for generating an output voltage signal across the magneto resistive circuit element;
   a first circuit connected to one end of the magneto resistive circuit element for applying a bias current of a desired value to the magneto resistive circuit element in response to the value to an input signal;
   a second circuit connected to the other end of the magneto resistive circuit element for setting the amplitude of the output voltage signal generated across the magneto resistive circuit element in response to the bias current; and,
   a third electrical circuit connected to both the first and second circuits for limiting the value of the bias current to a predetermined level in response to a short circuit condition of the magneto-resistive circuit element; and wherein
   the first, second and third electrical circuits are fabricated in an integrated circuit structure.

6. The apparatus according to claim 5, wherein said first and second electrical circuits includes a respective first and second current control device, each having a pair of current conducting terminals and a control terminal for controlling conduction between the conducting terminals,
   said pair of current conducting terminals of said first current control devices being connected between one side of said circuit element and a first bias voltage supply source,
   said pair of current conducting terminals of the other of said current control devices being connected between the other side of said circuit element and a second bias voltage supply source,
   a first signal amplifier circuit responsive to an input signal for applying an output signal to the control terminals of the first current control device,
   a second signal amplifier circuit responsive to a signal corresponding to the bias current for applying an output signal to the control terminal of said second current control device, so as to provide a current balance in said first and second current control devices during normal or non-shorted operation, and,
   wherein said third electrical circuit includes a third and fourth current control device, each having a pair of current conducting terminals and a current control terminal, said pairs of current conducting terminals of the third and fourth current control devices being connected in a cascade circuit connection between said first and second bias voltage supply sources, the current control terminal of the third current control device being connected with the output signal of the first signal amplifier also applied to the control terminal of the first current control device, and,
   a third signal amplifier circuit responsive to a signal corresponding to a current flowing between the third and fourth current control devices for applying an output signal to the control terminal of the second current device along with the output signal of the second signal amplifier for clamping the control terminal of the second current control to a voltage corresponding to the output signal of the third signal amplifier in the event a short circuit condition occurs in said circuit element.

7. The apparatus according to claim 6 and additionally including a first resistive impedance connected between one of the current conducting terminals of the first current control device and the first bias voltage supply source, a second resistive impedance connected between one of the current conducting terminals of the second current control device and the second bias voltage supply source, third resistive impedance connected between one of the current conducting terminals of the third current control device and the first bias voltage supply source, and a fourth resistive impedance connected between the current conducting terminals of the third and fourth current control devices, wherein the value of the fourth resistive impedance is greater than the value of the second resistive impedance and where an input of the third signal amplifier is connected to one side of the fourth resistive element.

8. The apparatus according to claim 7 wherein the value of the first resistive impedance is substantially equal to the value of the third resistive impedance.

9. The apparatus according to claim 8 and additionally including a pair of series connected resistive impedances connected across the magneto-resistor element and having an intermediate connection connected to an input of the second signal amplifier.

10. The apparatus according to claim 9 wherein the magneto-resistive circuit element forms part of read head for a hard disk drive.

11. The apparatus according to claim 9 wherein the current control devices comprise semiconductor devices.

12. The apparatus according to claim 11 wherein said semiconductor devices comprise transistors.

13. The apparatus according to claim 11 wherein the first and second current control devices comprise transistors of mutually opposite type semiconductor material.

14. The apparatus according to claim 11 wherein the third and fourth current control devices comprise transistors of mutually opposite type semiconductor material.

15. The apparatus according to claim 14 wherein the first and third transistors comprise transistors of a first type semiconductor material and second and fourth transistors comprise transistors of a second type semiconductor material.

16. The apparatus according to claim 9 wherein the first signal amplifier circuit includes an amplifier having a first polarity input terminal connected to the input signal and a second polarity input terminal connected to an output terminal thereof through the first current control device.

17. The apparatus according to claim 9 wherein the second signal amplifier circuit includes an amplifier having a first polarity input terminal connected to a signal corresponding to the bias voltage and a second polarity input terminal connected to a point of reference potential or ground.

18. The apparatus according to claim 9 wherein the third signal amplifier circuit includes an amplifier having a first polarity input terminal connected to the signal corresponding to the current flowing between the third and fourth current control devices and a second polarity input terminal directly connected to an output terminal thereof.

19. Apparatus for limiting current in a magneto-resistive circuit element, comprising:
   a magneto resistive circuit element operating in response to a bias current fed thereto for generating an output voltage signal across the magneto resistive circuit element;
   a first circuit connected one end of the magneto resistive circuit element for applying a bias current of a desired value to the magneto resistive circuit element in response to the value to an input signal;
   a second circuit connected to the other end of the magneto resistive circuit element for setting the amplitude of the output voltage signal generated across the magneto resistive circuit element in response to the bias current; and,
   a third electrical circuit, connected to both the first and second circuits, for limiting the value of the bias current to a predetermined level in response to a short circuit condition of the magneto-resistive circuit element without controlling a duty ratio of a switch.

20. Apparatus for limiting current in a magneto-resistive circuit element, comprising:
   a magneto resistive circuit element operating in response to a bias current fed thereto for generating an output voltage signal across the magneto resistive circuit element;
   a first circuit connected to one end of the magneto resistive circuit element for applying a bias current of a desired value via a transistor to the magneto resistive circuit element in response to the value to an input signal;
   a second circuit connected to the other end of the magneto resistive circuit element for setting the amplitude of the output voltage signal generated across the magneto resistive circuit element in response to the bias current; and,
   a third electrical circuit, connected to both the first and second circuits, for limiting the value of the bias current to a predetermined level in response to a short circuit condition of the magneto-resistive circuit element by clamping a voltage applied to a gate of the transistor in the first circuit.

* * * * *